US006938425B2

(12) United States Patent
Simpson et al.

(10) Patent No.: US 6,938,425 B2
(45) Date of Patent: Sep. 6, 2005

(54) SYSTEM AND METHOD FOR CONTROLLING WATER INJECTION IN A TURBINE ENGINE

(75) Inventors: Gerard E. Simpson, Orlando, FL (US); John Nest, Maitland, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 150 days.

(21) Appl. No.: 10/638,724

(22) Filed: Aug. 11, 2003

(65) Prior Publication Data

US 2005/0034463 A1 Feb. 17, 2005

(51) Int. Cl.[7] .................................................. F02C 3/30
(52) U.S. Cl. .......................... 60/775; 60/39.3; 60/39.55
(58) Field of Search ............................... 60/39.3, 39.53, 60/39.54, 39.55, 39.59, 775, 39.58; 431/190

(56) References Cited

U.S. PATENT DOCUMENTS 2,469,678 A * 5/1949 Wyman ...................... 60/39.3
3,989,465 A 11/1976 Onnen
4,003,711 A 1/1977 Hishinuma et al.
4,131,432 A 12/1978 Sato et al.
5,463,873 A 11/1995 Early et al.
5,584,172 A 12/1996 Oguchi et al.
RE35,776 E 4/1998 Sugano et al.
5,806,316 A 9/1998 Avakov et al.
5,809,943 A 9/1998 Olia
5,867,977 A 2/1999 Zachary et al.
6,145,318 A 11/2000 Kaplan et al.
6,357,218 B1 3/2002 Ranasinghe et al.
6,381,964 B1 5/2002 Pritchard, Jr. et al.
6,449,953 B1 9/2002 Hook, Jr. et al.
6,478,289 B1 * 11/2002 Trewin ...................... 60/39.53
6,484,490 B1 11/2002 Olsen et al.
6,516,603 B1 2/2003 Urbach et al.
6,526,742 B1 * 3/2003 Ausserwoger et al. ..... 60/39.55
6,530,210 B2 3/2003 Horii et al.
6,536,206 B2 3/2003 Hook, Jr. et al.
6,553,753 B1 4/2003 Payling et al.
2004/0011046 A1 * 1/2004 Pierson ........................ 60/772

* cited by examiner

*Primary Examiner*—Louis J. Casaregola

(57) ABSTRACT

A method for controlling the injection of water into the combustor (16) of a gas turbine (18) may include determining a flow rate of water to be injected into the combustor (16) and controlling (86) a centrifugal pump (20) with a variable frequency drive (40) to control the flow rate of water. The flow rate of water may be further controlled by controlling (88) a throttle valve (32) to control water flow through a recirculation line (28) of a water circuit (24) that directs the flow rate of water to the combustor (16). A system (10) for controlling the injection of water into the combustor (16) may include a water delivery circuit (24) for directing water from a water supply (12) to the combustor (16), a centrifugal pump (20) for pumping water through the water delivery circuit (24) and a variable frequency drive (40) for controlling a motor (42) driving the centrifugal pump (20). A system (70) may include a gas turbine (18), a combustor (16) integral with the gas turbine, a water circuit (24) for delivering a flow rate of water to a combustor (16) of the gas turbine, a variable frequency drive (40) for controlling a motor (42) driving the centrifugal pump (20) and a controller (72) configured to control the variable frequency drive (40) so that the centrifugal pump (20) produces a desired flow rate of water.

20 Claims, 2 Drawing Sheets

SYSTEM AND METHOD FOR CONTROLLING WATER INJECTION IN A TURBINE ENGINE

FIELD OF THE INVENTION

This invention relates in general to turbine engines and more particularly to a system and method for controlling water flow for injection into a turbine basket combustion zone to reduce NOx emissions and for controlling water recirculation.

BACKGROUND OF THE INVENTION

It is known that nitrous oxide ("NOx") emission output is directly related to combustion flame temperature within a gas turbine combustor. To control that temperature and in turn the NOx output, water can be added to the combustion process. High volumes of water are typically used for controlling NOx emissions with some of the water being recirculated rather than injected into the combustor. Known systems for controlling water flow use a centrifugal pump with valving to throttle the forward flow to meet a set rate of gallons per minute. Recirculation is typically required because the pump generates a higher flow rate of water than is needed for injection into the combustor. The recirculated water may be pumped through a water return line to a holding tank remote from the turbine.

BRIEF SUMMARY OF THE INVENTION

A method for controlling the injection of water into the combustor of a gas turbine is provided that may include determining a flow rate of water to be injected into the combustor and controlling a centrifugal pump with a variable frequency drive to control the flow rate of water. One aspect allows for further controlling the flow rate of water by controlling a throttle valve to control water flow through a recirculation line of a water circuit that directs the flow rate of water to the combustor. Another aspect allows for controlling the centrifugal pump with the variable frequency drive to control the flow rate of water in response to a measured emission parameter.

A system for controlling the injection of water into a combustor of a gas turbine is provided that may include a water delivery circuit for directing water from a water supply to the combustor, a centrifugal pump for pumping water through the water delivery circuit and a variable frequency drive for controlling a motor driving the centrifugal pump. One aspect allows for a controller to control a throttle valve and the variable frequency drive in cooperation to produce a predetermined flow rate of water to the combustor. Another aspect provides means for measuring an emission parameter associated with the combustor and wherein a controller is responsive to the measured emission parameter for controlling the variable frequency drive.

In accordance with various aspects of the invention a system is provided that may include a gas turbine, a combustor integral with the gas turbine, a water circuit for delivering a flow rate of water to a combustor of the gas turbine, the water circuit including a supply line connecting a water supply to a centrifugal pump, a delivery line connecting the centrifugal pump to the combustor and a recirculation line connecting the supply line to the delivery line, a variable frequency drive for controlling a motor driving the centrifugal pump and a controller configured to control the variable frequency drive so that the centrifugal pump produces a desired flow rate of water. One aspect allows for a throttle valve in the recirculation line and wherein the controller is further configured to control the throttle valve in cooperation with the variable frequency drive to produce a desired flow rate of water to the combustor. Another aspect allows for the controller to be further configured to control at least one of the variable frequency drive and the throttle valve to deliver a predetermined schedule of flow rates of water to the combustor as a function of an operating load of the gas turbine.

BRIEF DESCRIPTION OF THE DRAWINGS

The invention will be more apparent from the following description in view of the drawings that show.

DETAILED DESCRIPTION OF THE INVENTION

Figure 1:
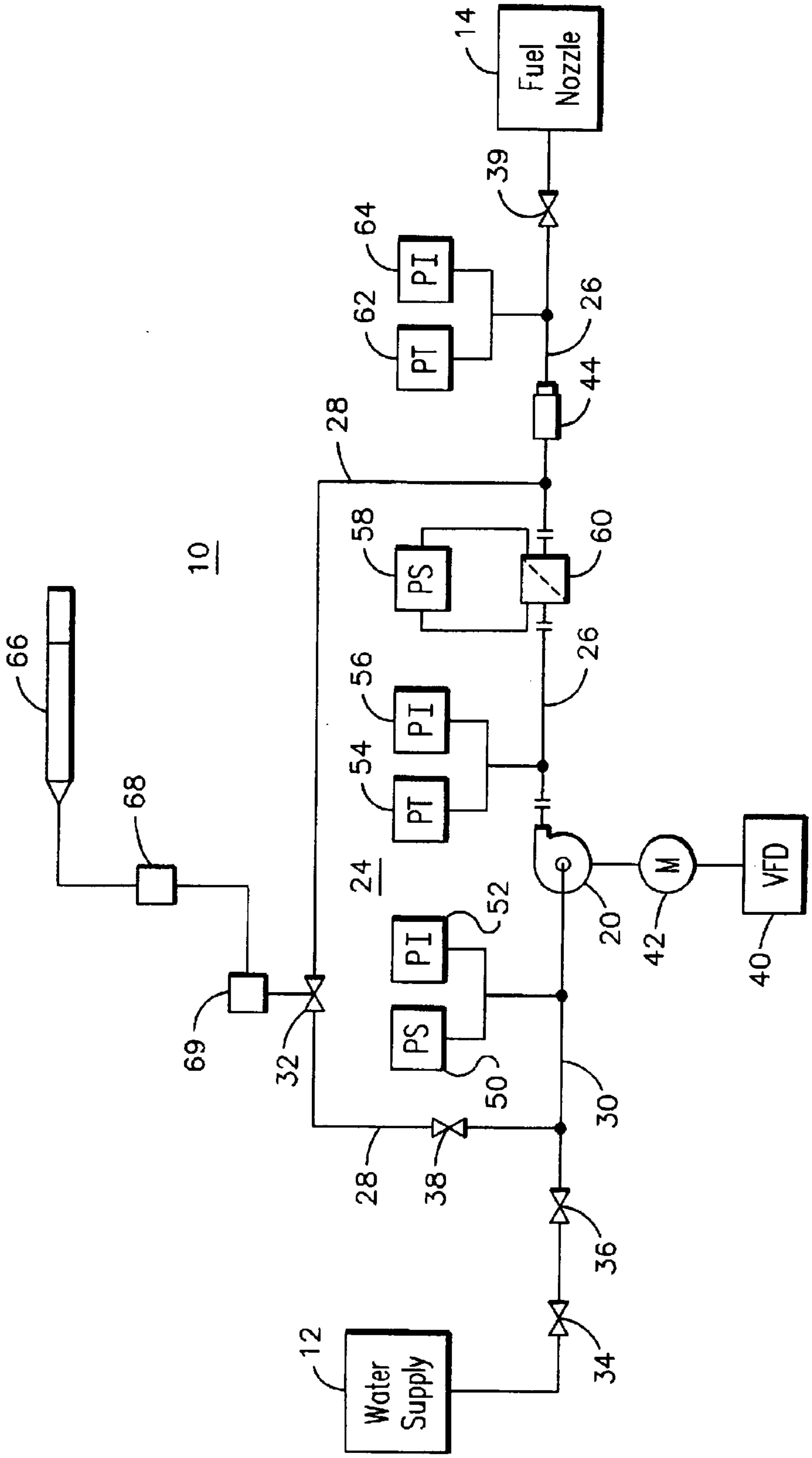
FIG. 1 is a schematic illustration of a exemplary system for controlling water injection into a turbine combustor and water recirculation.
Figure 2:
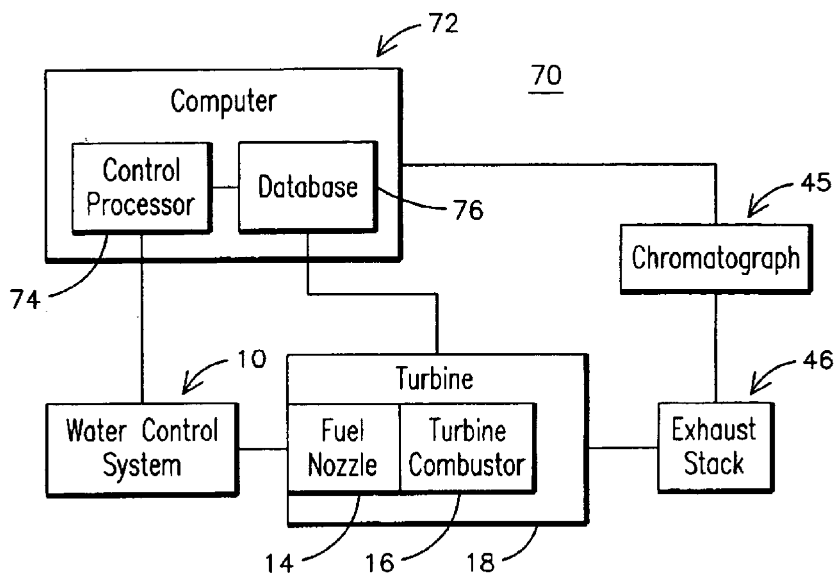
FIG. 2 is a block diagram of an exemplary embodiment of a turbine operating system.

FIG. 1 illustrates a schematic of an exemplary system 10 for controlling water flow from a water supply 12 to a fuel nozzle 14 for injection into the turbine combustor 16, shown in FIG. 2, of a gas turbine engine 18 to control an emissions parameter, such as NOx, during the combustion process. Water may be supplied to a separate inlet port in a fuel nozzle or to other locations of turbine 18 according to aspects of the invention. Water may be distributed to a plurality of fuel nozzles located around turbine 18 by means of an injection nozzle ring, not shown. Water supply 12 may be a water storage tank supplying demineralized water. One aspect allows for the components of system 10 to be mounted on a portable skid, not shown, so the system 10 may be moved into place and connected between water supply 12 and fuel nozzle 14.

The system 10 may utilize a centrifugal pump 20. Centrifugal pump 20 may be a high-speed, medium-pressure, centrifugal-type geared pump that may be driven by an AC induction motor, for example, or other suitable pump and motor combinations known in the art. Water may be delivered from the water supply 12 to pump 20 by means of a water forwarding system that may include a forwarding pump, not shown, or the water may be forwarded just by the pressure head in the water storage tank. Pump 20 may pump water through a water circuit 24 that includes a water delivery line 26, a water recirculation line 28 and a water supply suction line 30. Delivery line 26 directs water flow to the fuel nozzle 14 and recirculation line 28 directs excess water not pumped to the fuel nozzle 14 back to the supply line 30. Centrifugal pump 20 may have a manufacturer specified pump curve indicating the various flow rates that pump 20 can produce at corresponding heads or pressures. Pump 20 may need to operate at least at a minimum motor speed to ensure a sufficient amount of water circulates within the pump for cooling. The system 10 may include a throttle valve 32 positioned in the recirculation line 28 to control recirculating water flow not immediately going to the fuel nozzle 14. Throttle valve 32 may be a pneumatically controlled valve that is fail closed, i.e., will close upon the loss of pneumatic pressure to the valve operator. Isolation valve 34 may be a normally-open ball valve and check valves 36, 38 may be provided in the water supply line 30 and the recirculation line 28, respectively. Check valve 36 stops reverse flow into the water supply 12 and valve 38 stops reverse flow in recirculation line 28. A check valve 39 may be provided in delivery line 26 to prevent water displacement when turbine 18 is operating without water injection into fuel nozzle 14. In accordance with aspects of the invention, a conventional variable frequency drive 40 may be used to control the speed of pump motor 42 and consequently the revolutions per minute or speed of the centrifugal pump 20. A flow meter 44 may be positioned in delivery line 26 to measure the actual amount of forward discharge flow to the fuel nozzle 14 and into the turbine combustor. Flow meter 44 may be digital vortex-style flow meter using the Karmen Vortex shedding principle that does not require an initial calibration, for example, or other suitable devices known in the art. A chromatograph 45, shown in FIG. 2, or other appropriate means such as a combustion/emissions analyzer may be used to measure an emissions parameter, such as a concentration of NOx, from the plant exhaust stack 46 or other convenient location of a power plant within which turbine 18 is operating.

Water circuit 24 may include a pump inlet pressure switch 50 and a pump inlet pressure indicator 52 upstream of pump 20. Pressure switch 50 may be set to stop the water injection pump 20 when the suction pressure falls below a predetermined set point. A pressure transmitter 54 and a pressure indicator 56 may be provided in delivery line 26 downstream of pump 20. Pressure transmitter 54 may convert the pressure in delivery line 26 to a calibrated electronic signal indicative of the pump 20 discharge pressure. This signal may be transmitted to a controller such as computer 72 shown in FIG. 2. A differential pressure switch 58 may be provided to trip an alarm when the differential pressure across a filter 60 is greater than a set point, which may indicate that maintenance to filter 60 is required. Filter 60 may be a simplex, screw-on-type canister with a removable internal filter element and may be a discharge filter rather than a suction filter to accommodate a low supply pressure from water supply 12. Delivery line 26 may include a pressure transmitter 62 and a pressure indicator 64 downstream of flow meter 44. Transmitter 62 may convert the pressure in delivery line 26 to a calibrated electronic signal indicative of discharge pressure to fuel nozzle 14. This signal may be transmitted to computer 72 shown in FIG. 2. Air supply 66, air regulator 68 and actuator 69 may be provided to control the throttle valve 32. Natural gas or other fuel may be delivered to fuel nozzle 14 by a conventional supply line not shown.

Figure 3:
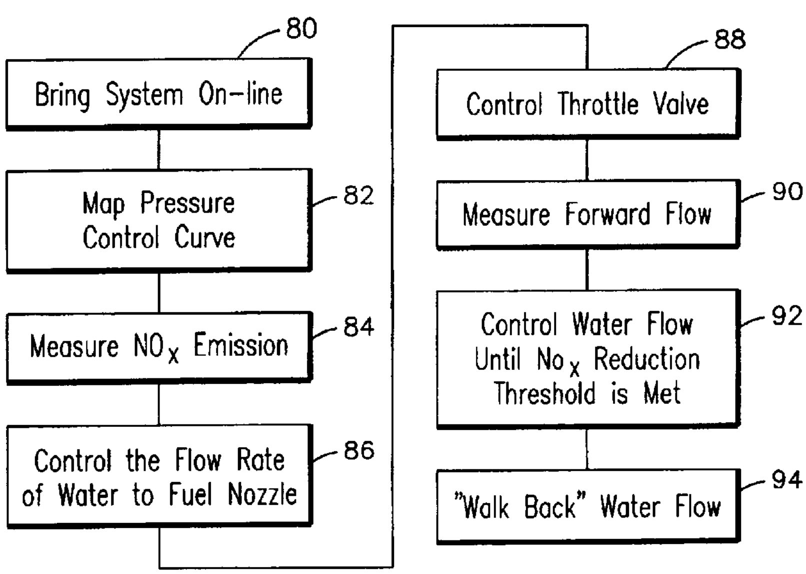
FIG. 3 is a flow diagram of an exemplary method for controlling water injection into a turbine combustor and water recirculation.

FIG. 2 illustrates a block diagram of an exemplary turbine operating system 70 that may include the water control system 10, fuel nozzle 14, turbine 18, turbine combustor 16, chromatograph 45 and a computer 72. Computer 72 may be a conventional computer that includes a control processor 74 and an associated database 76. Control processor 74 may be configured with a control logic scheme that manages and processes dynamic operating parameter data from the turbine 18, turbine combustor 16 and chromatograph 45 to control the water control system 10. In one aspect of the invention step 80 of FIG. 3 allows for the water control system 10 to be brought on-line in response to the turbine 18 operating at a 70% load or greater. Water control system 10 may be brought on-line after the combustor 16 dynamics become stable or independent of whether they are stable. Alternate embodiments allow for system 10 to be brought on-line as a function of the operating parameters of turbine 18, on-site environmental factors affecting the operation of turbine 18 and/or emission parameter regulations, for example. One aspect allows for system 10 to be brought on-line using a NOx chart developed for use with turbine 18 to determine an initial amount of water to introduce into the system. The NOx chart may indicate an expected reduction in NOx emissions in response to an associated flow rate of water. In this respect, when turbine 18 achieves a 70% load or greater, centrifugal pump 20 may pump an initial amount of water to the turbine 18 based solely on the NOx chart. This may typically occur when the water control system 10 is used with power plants that do not monitor NOx emissions in real-time. As manual measurements of NOx emissions are sampled and transmitted to an operator of water control system 10, the flow rate of water to the turbine 18 may be manually controlled in response to those measurements in accordance with aspects of the invention described below.

To bring water control system 10 on-line, another aspect of the invention allows for computer 72 to control water control system 10 for injecting water into fuel nozzle 14 based on a predetermined schedule for turbine 18. Table 1 illustrates an exemplary schedule that may be used in accordance with aspects of the invention. In this respect, control processor 74 may be configured to set variable frequency drive 40 and throttle valve 32 at predetermined values to produce a desired flow rate of water when turbine 18 is operating at a given load illustrated in Table 1. Setting these parameters at these values allows for an NOx emission reduction at the predicted levels illustrated in Table 1.

TABLE 1

| VFD (hertz) | Water Flow to Nozzle (gpm) | Pressure (psi) | Valve Position (% open) | Turbine Load (%) | NOx Emission Reduction (ppm) |
|---|---|---|---|---|---|
| 46.77 | 2 | 261.8 | 30.0 | 70 | 2 |
| 46.77 | 3 | 265 | 26.8 | 75 | 3 |
| 46.77 | 4 | 267 | 22.3 | 80 | 4 |
| 47.48 | 5 | 276 | 20.0 | 85 | 4.5 |
| 52.13 | 8 | 297 | 20.0 | 90 | 4.7 |
| 46.7 | 9 | 308 | 0.0 | 95 | 5 |
| 53.4 | 12 | 385 | 0.0 | 100 | 5.1 |

Table 1 indicates that a predicted NOx emission reduction will be attained from a turbine 18 operating at a known load when a predetermined flow rate of water is delivered to the fuel nozzle 14. This flow rate is produce by setting the variable frequency drive 40 and the position of throttle valve 32 as indicated above. One aspect allows for the NOx emission to be measured by chromatograph 45 and data indicative of those levels transmitted to computer 72. The actual NOx emission reduction may vary from the predicted levels due to operating dynamics of turbine 18 and/or on-site environmental factors, for example. As turbine 18 ramps up from a 70% load to a 100% load, or remains in operation at a given load, the variable frequency drive 40 and/or throttle valve 32 may be controlled in cooperation with each other by computer 72 in response to the actual level of NOx emissions. This allows for computer 72 to control the flow rate of water delivered to fuel nozzle 14 to bring the NOx emission level within the predicted level shown in Table 1 for each load or to maintain the emission level within a predetermined range.

Another aspect of the invention allows for an emissions parameter, such as NOx emissions, to be continuously or periodically monitored by chromatograph 45, transmitted to computer 72 and used as input for control of variable frequency device 40 and throttle valve 32 to deliver desired flow rates of water to fuel nozzle 14 as described below. Rather than delivering water based on a NOx chart or on a predetermined schedule, water control system 10 may control variable frequency device 40 and throttle valve 32 in response to real time or near real time measurements of NOx or other emission parameter levels.

Step 82 allows for mapping or programming a pressure control curve into computer 72 based on the fuel nozzle 14 characteristics. This may be done after water control system 10 is brought on-line or prior to bringing it on-line. The pressure control curve is indicative of the minimal pressure required at the input end of fuel nozzle 14 to allow a specific flow rate of water to pass through nozzle 14 and be output from the nozzle at a specific pressure. The pressure control curve may be calibrated for specific load percentages of turbine 18 and may be mapped as a function of an algorithm developed by turbine designers. This algorithm may account for the pressure drop across fuel nozzle 14 and other operating parameters of turbine 18 such as back-pressure from the turbine combustor 16 into the fuel nozzle. In one aspect of the invention, once the turbine 18 is stable after bringing system 10 on-line, the NOx level may be measured in step 84 by chromatograph 45, transmitted to computer 72 and recorded in database 76. Determining whether the turbine 18 is stable may be accomplished by known techniques such as by using accelerometers mounted in the combustor basket, for example, to measure a stability parameter such as vibration. The accelerometers may measure vibration levels within the combustor basket and transmit data indicative of the measured vibration levels to computer 72. Control processor 74 may be configured to compare the measured vibration levels to predefined vibration thresholds or ranges indicative of whether turbine 18 is operating in a stable or unstable mode. This allows for processor 74 to determine whether turbine 18 is stable or unstable. For example, if the measured vibration level exceeds a predefined vibration threshold, then turbine 18 is determined to be operating in an unstable mode. Control processor 74 may be further configured to measure the NOx levels in response to data from the accelerometers and determining whether turbine 18 is stable or unstable. Alternate embodiments allow for NOx levels to be measured independent of whether turbine 18 is operating at a stable point. Other techniques may be used to determine combustion stability, such as optical measurements of a stability parameter associated with the combustion flame.

Step 86 allows for controlling the flow rate of water delivered to fuel nozzle 14 in response to the measured level of NOx, other emission parameters or other variables affected by water being introduced into the turbine 18. To accomplish this, control system 10 may transmit a control signal to control the variable frequency drive 40 thereby increasing or decreasing the hertz of motor 42. Controlling the hertz of motor 42 allows for controlling the revolutions per minute of centrifugal pump 20 and consequently the pump curve associated with pump 20. In this respect, the pump curve may be controlled so that centrifugal pump 20 operates at a speed that most closely produces the selected flow rate to turbine combustor 16 at the minimal pressure control curve requirement for that flow rate. In other words, the revolutions per minute of pump 20 may be controlled with variable frequency drive 40 so that the flow rate produced by pump 20 is as close as possible to the selected flow rate with the associated point on the pump curve sufficiently exceeding the minimal pressure control curve requirement of fuel nozzle 14 to produce a forward flow of water to fuel nozzle 14. In conjunction with controlling the speed of pump 20, step 88 allows for controlling the position of throttle valve 32, which allows for minimal water flow through recirculation line 28. In one embodiment, after pump 20 has been controlled to produce a flow rate as described above within delivery line 26 throttle valve 32 may be controlled to further adjust the flow rate. Controlling pump 20 may function as a fine adjustment to the flow rate whereas controlling throttle valve 32 may function as a coarser adjustment. Controlling pump 20 and throttle valve 32 sequentially or simultaneously allows for delivering a flow rate of water to fuel nozzle 14 at a tunable rate. In this respect, after controlling pump 20 as described above it will be operating at a specific speed or revolutions per minute. The position of throttle valve 32 may then be controlled to further control the flow rate being produce by pump 20 operating at the specific speed or revolutions per minute. Throttle valve 32 may be controlled so the flow rate produced by pump 20 at the specific speed is as close as possible to the flow rate required for delivery to fuel nozzle 14. Alternately, pump 20 and throttle valve 32 may be controlled to maintain the emission parameter at a certain level or within a certain range. Pump 20 and throttle valve 32 may be controlled sequentially or simultaneously to control the delivery of water to fuel nozzle 14 at the required flow rate and pressure while minimizing the amount of water being recirculated through recirculation line 28.

In one exemplary embodiment, when system 10 is initially brought on-line, throttle valve 32 may be moved to a predetermined position, such as to the 30% open position. Such predetermined position may be selected to allow for an adequate flow of water through recirculation line 28 to ensure that pump 20 is able to produce a forward flow of water in delivery line 26 and does not dead head until a sufficient pressure is established. It will be recognized by those skilled in the art that setting throttle valve at a 30% open position is a function of the sizing of the valve 32 as well as other design parameters of water control circuit 10. With throttle valve 30% open, system 10 may control the variable frequency drive 40 and consequently the revolutions per minute of pump 20. This allows for varying the pump curve so that pump 20 will deliver the desired flow rate of water to fuel nozzle 14 at a pressure approximately equal to the minimum pressure requirement on the pressure control curve mapped into computer 72 in step 82. Throttle valve 32 may then be controlled to close at a rate, such as an incremental percentage per second for example, until the desired injection flow rate is reached. One embodiment allows for a lower limit to be set for throttle valve 32, such as 10% open +/−1%, in order to ensure sufficient cooling of pump 20 when the forward flow is at a very low flow rate.

Step 90 allows for the actual forward flow of water toward fuel nozzle 14 to be measured by flow meter 44. The measured forward flow may be transmitted to computer 72 so that the flow rate of water to fuel nozzle 14 may be continually increased or decreased until a NOx reduction threshold is met. On achieving this threshold, system 10 may continue to control the water flow until only negligible gains are made in further NOx reduction with a further increase in water flow. In one exemplary embodiment the hertz of variable frequency drive 40 may be controlled to increase the water flow rate to fuel nozzle 14 in steps of 0.25 gpm. When the last step increase in water flow achieves a NOx reduction of less than 0.2 parts per million, the hertz of variable frequency drive 40 may be decreased to the previous 0.25 gpm hertz setting. When this occurs step 94 allows for water control system 10 to “walk back” or decrease the water flow rate produced by pump 20 provided the NOx emission remains at an acceptable level or within an acceptable range. The hertz of variable frequency device 40 may be balanced against the recirculation flow rate to optimize the motor load on pump 20 and flow rate through recirculation line 28. These parameters may be optimized while ensuring that only an acceptable degree of dynamics, i.e., the degree of pressure instability within the combustor 16, is introduced into the combustion basket of turbine combustor 16. System 10 may continuously and/or periodically control the hertz of motor 42, via the variable frequency drive 40, and throttle valve 32 to ensure a forward flow of water from pump 20 at a constant flow rate, within acceptable limits, and a minimal pressure requirement. As the load percentage on turbine 18 changes, system 10 may repeat steps 84 through 94 to maintain the lowest NOx emission level with the combustor 16 stable while maximizing efficiency of the motor load for pump 20 and minimizing water flow through recirculation line 28. One embodiment allows for the throttle valve 32 to be moved to a closed position so the motor load for pump 20 is at its most efficient point and water flow through recirculation line 28 is at zero. Thus, water control system 10 will reduce the cost of operation of a gas turbine when compared to a prior art system where the water injection pump is operated at a constant speed and the injection flow rate is controlled with bypass flow only. Consequently, water control system 10 maximizes the efficiency of a normally inefficient system of pumping known in the prior art.

In the event the dynamics of combustor 16 become unstable, as determined by accelerometers in the combustion basket for example, system 10 may control the position of throttle valve 32 and/or hertz of variable frequency device 40 to reduce the flow rate of water being injected into fuel nozzle 14. If the combustor dynamics are still unstable after reducing the flow rate then the throttle valve 32 and the hertz of variable frequency drive 40 may be locked down or held in a steady state until the combustor dynamics return to a stable point. This allows for an operator of turbine 18 to determine why the combustor dynamics are unstable. Once the combustor dynamics are stable system 10 may resume monitoring NOx emissions and controlling pump 20 and throttle valve 34 in response to those emission levels or resume delivering water on the predetermined schedule noted above.

A minimal amount of water may flow through recirculation line 28 due to the slight difference that may occur between the pressure point on the pump curve producing the required flow rate and the pressure requirement of fuel nozzle 14. For example, testing indicates that one exemplary embodiment of the invention results in a recirculation flow rate of 0.6 gallons per minute when the flow/pressure required at fuel nozzle 14 are 4 gallons per minute @ 325 pounds per square inch and the pump curve of pump 20 established in step 86 is 4.6 gallons per minute @ 325 pounds per square inch. The minimum speed and cooling requirements of pump 20 may be taken into account when establishing the pump curve in step 86. Water entering water circuit 24 through supply line 30 may be monitored to ensure that pump 20 is properly cooled during operation.

While the exemplary embodiments of the invention have been shown and described by way of example only, numerous variations, changes and substitutions will occur to those of skill in the art without departing from the invention herein. Accordingly, it is intended that the invention be limited only by the spirit and scope of the appended claims.

We claim:

1. A method for controlling the injection of water into the combustor of a gas turbine, the method comprising:

determining a flow rate of water to be injected into a combustor; and controlling a centrifugal pump with a variable frequency drive to control the flow rate of water.

2. The method of claim 1 further comprising:

further controlling the flow rate of water by controlling a throttle valve to control water flow through a recirculation line of a water circuit that directs the flow rate of water to the combustor.

3. The method of claim 1 further comprising:

measuring an emission parameter associated with the combustor; and controlling the centrifugal pump with the variable frequency drive to control the flow rate of water in response to the measured emission parameter.

4. The method of claim 1 further comprising:

determining the flow rate of water when the gas turbine is operating at or above a predetermined load; and controlling a throttle valve to control water flow through a recirculation line of a water circuit that directs the flow rate of water to the combustor.

5. The method of claim 1 further comprising:

controlling the flow rate of water until an emission parameter reduction threshold is met; and reducing the flow rate of water in response to meeting the emission parameter reduction threshold.

6. The method of claim 2 further comprising:

controlling at least one of the group of the throttle valve and the variable frequency drive to reduce the flow rate of water in response to measuring a stability parameter associated with the combustor and determining that the combustor is operating in an unstable mode.

7. The method of claim 6 further comprising:

maintaining the throttle valve and the variable frequency drive in a steady state in the event the combustor continues to operate in an unstable mode after reducing the flow rate of water.

8. The method of claim 2 further comprising:

measuring an emission parameter associated with the combustor when the gas turbine is operating at or above a predetermined load; and controlling the flow rate of water in response to the measured emission parameter.

9. The method of claim 2 further comprising:

controlling the flow rate of water with at least one of the group of the throttle valve and the variable frequency drive to maintain an emission parameter associated with the combustor within a predetermined range.

10. The method of claim 2 further comprising:

controlling at least one of the group of the variable frequency drive and the throttle valve to deliver a plurality of flow rates of water to the combustor on a predetermined schedule to control output of an emission parameter when the gas turbine is operating at a corresponding plurality of loads.

11. A system for controlling the injection of water into a combustor of a gas turbine, the system comprising:

a water delivery circuit for directing water from a water supply to the combustor;

a centrifugal pump for pumping water through the water delivery circuit; and a variable frequency drive for controlling a motor driving the centrifugal pump.

12. The system of claim 11 further comprising:

a throttle valve in a recirculation line of the water delivery circuit to control water flow through the recirculation line.

13. The system of claim 12 further comprising:

a controller to control the throttle valve and the variable frequency drive in cooperation to produce a predetermined flow rate of water to the combustor.

14. The system of claim 13 wherein the controller is further configured to control at least one of the group of the throttle valve and the variable frequency drive to produce the predetermined flow rate of water in accordance with a predetermined schedule.

15. The system of claim 11 further comprising:

means for measuring an emission parameter associated with the combustor; and a controller responsive to the measured emission parameter for controlling the variable frequency drive.

16. The system of claim 15 wherein the controller is further configured to maintain the variable frequency drive in a steady state in the event that a measured stability parameter of combustor dynamics exceeds a predefined threshold.

17. A system comprising:

a gas turbine;

a combustor integral with the gas turbine;

a water circuit for delivering a flow rate of water to a combustor of the gas turbine, the water circuit comprising a supply line connecting a water supply to a centrifugal pump, a delivery line connecting the centrifugal pump to the combustor and a recirculation line connecting the supply line to the delivery line;

a variable frequency drive for controlling a motor driving the centrifugal pump; and a controller configured to control the variable frequency drive so that the centrifugal pump produces a desired flow rate of water.

18. The system of claim 17 further comprising:

means for measuring an emission parameter associated with the combustor; and wherein the controller is further configured to control the variable frequency drive in response to the measured emission parameter.

19. The system of claim 17 further comprising:

a throttle valve in the recirculation line; and wherein the controller is further configured to control the throttle valve in cooperation with the variable frequency drive to produce a desired flow rate of water to the combustor.

20. The system of claim 19 wherein the controller is further configured to control at least one of the group of the variable frequency drive and the throttle valve to deliver a predetermined schedule of flow rates of water to the combustor as a function of an operating load of the gas turbine.

* * * * *